United States Patent
de Almeida Rodrigues et al.

(10) Patent No.: US 6,685,401 B1
(45) Date of Patent: Feb. 3, 2004

(54) APPARATUS AND METHOD FOR CONTROLLING SUSPENDED ARTICLES IN AN AIR CONVEYOR

(75) Inventors: Carlos de Almeida Rodrigues, Lille (FR); Joël Trenel, Marcq en Baroeul (FR); Damien Rose, Lille (FR)

(73) Assignee: Netra Systems, Marcq en Baroeul (FR)

( * ) Notice: Subject to any disclaimer, the term of this patent is extended or adjusted under 35 U.S.C. 154(b) by 0 days.

(21) Appl. No.: 09/744,064

(22) PCT Filed: Jul. 5, 1999

(86) PCT No.: PCT/FR99/01613

§ 371 (c)(1),
(2), (4) Date: Jan. 18, 2001

(87) PCT Pub. No.: WO00/05160

PCT Pub. Date: Feb. 3, 2000

(30) Foreign Application Priority Data

Jul. 21, 1998 (FR) ............................. 98 09525

(51) Int. Cl.⁷ ............................................ B65G 51/16
(52) U.S. Cl. .............................. 406/11; 406/13; 406/15; 406/84; 406/88; 406/192
(58) Field of Search ................. 406/11, 19, 86, 406/88, 192, 84, 13

(56) References Cited

U.S. PATENT DOCUMENTS

| | | | |
|---|---|---|---|
| 4,284,370 A | 8/1981 | Danler et al. | |
| 4,462,720 A * | 7/1984 | Lenhart | 406/84 |
| 5,161,919 A | 11/1992 | Smith et al. | |
| 5,466,096 A * | 11/1995 | Hilbish et al. | 406/84 |
| 5,984,591 A * | 11/1999 | Hilbish et al. | 406/88 |
| 6,000,884 A * | 12/1999 | Ingraham | 198/340 |
| 6,190,094 B1 * | 2/2001 | Rediess et al. | 406/19 |
| 6,318,935 B1 * | 11/2001 | Ouellette | 198/836.3 |
| 6,368,027 B1 * | 4/2002 | Trenel et al. | 406/83 |
| 6,514,015 B1 * | 2/2003 | Trenel et al. | 406/86 |

FOREIGN PATENT DOCUMENTS

WO    WO 90 10587 A    9/1990

* cited by examiner

Primary Examiner—Joseph A. Dillon
(74) Attorney, Agent, or Firm—Weingarten, Schurgin, Gagnebin & Lebovici LLP (57) ABSTRACT

The air conveyor comprises a guide rail (3) on which the articles (1) are to be suspended, and along which the articles are to be transported in a given direction of transport. The conveyor system provides a pneumatic means to move the articles in the direction of transport and further includes additional pneumatic means (10) that are designed to generate, when operated, a plurality of reverse air jets orientated onto the articles in a direction opposite that of their direction of transport. The user of the reverse jets makes it possible, in particular, to free without manual intervention articles accidentally immobilised in the course of transport, or, to slow down, immobilise or impart a rhythm to the articles as they are transported.

19 Claims, 4 Drawing Sheets

APPARATUS AND METHOD FOR CONTROLLING SUSPENDED ARTICLES IN AN AIR CONVEYOR

The present invention relates to a novel air conveyor for transporting suspended articles, whereof the aeraulic means enabling jets of air to be generated in the direction of the articles have been perfected so as, in particular, but not exclusively, to make it easier to free articles that have accidentally jammed during transport. Its objects also include a process for freeing articles accidentally jammed during their transport in an air conveyor, a process for slowing down or immobilising articles being transported, and a process for imparting a rhythm to articles being transported. Advantageously, it will find an application in the field of pneumatic conveying of light articles such as, for example empty plastic bottles or flasks which are transported while being suspended via their collars or the like.

To transport light articles and, more especially, plastic bottles or the like, it is known, to date, to use air conveyors equipped with blowing means permitting the creation of a plurality of jets of air orientated towards the articles in their direction of transport.

In the case of articles that can be suspended, such as, for example, plastic bottles comprising a collar in the area of their neck, use is made, more particularly, of air conveyors that are equipped with a guide rail, more commonly referred to as an 'under-neck guide', along which the articles are guided and transported while suspended via their collars, or the like. This type of conveyor is disclosed, for example, in U.S. Pat. No. 4,284,370, or again, in U.S. Pat. No. 5,161,919. It implements a main air duct, commonly referred to as a 'plenum', which extends along the path of the articles, and a blowing channel communicating with the main air duct via blowing slits or the like. The main duct is supplied with air, for example by means of several fans judiciously distributed over its entire length; this air is discharged via the blowing slits in the form of a plurality of air jets enabling the articles to be propelled along the blowing channel. In U.S. Pat. No. 4,284,370, the blowing channel has a rectangular cross-section, and the blowing slits are disposed above the guide rail, which makes it possible to propel the articles by blowing above their collars. In U.S. Pat. No. 5,161,919, the blowing channel has the shape of an inverted V, and the blowing slits are disposed below the guide rail, which enables the articles to be propelled by blowing under their collars.

When plastic bottles, for example, are transported with the aforementioned air conveyors, with the bottles suspended via their collars or the like, they tend, during transport, to oscillate longitudinally forwards and backwards in a vertical plane parallel to their direction of transport. These forward/backward oscillation movements are known to give rise to the forward or backward jamming of the bottles in relation to the guide rail. Forward or backward jamming occurs, for example, when a bottle oscillates forwards or backwards to an excessive degree and becomes jammed in relation to the guide rail in this position, for example by the bottle immediately following it. Jamming is also frequent in the case of an accumulation of bottles. For example, when a bottle comes too quickly into contact with a train of accumulated bottles, it may roll on this bottle, tipping longitudinally backwards. In this case, the following bottle, when it comes into contact with this backward tipping bottle, exerts thereon a pressure which results in the backward tipping bottle riding up and jamming, for instance, in the guide rail. Likewise, when they have accumulated, the bottles are pressed against one another and tend to ride up and jam in the guide rail.

To date, when a bottle jams, a manual intervention becomes necessary in order to free the immobilised bottle and, as a result, the bottles that have accumulated behind said bottle. Such manual interventions take quite a long time and can be prejudicial in terms of productivity, particularly when it is necessary to halt the machine upstream and/or the machine downstream of the conveyor. What is more, with certain types of conveyor, it is not easy to gain access to the bottles being transported, these being, for example, transported at some height or inside a closed conveyor.

The present invention provides a novel air conveyor, one of the main advantages of which is that it enables the articles transported to be freed swiftly, without manual intervention.

The air conveyor according to the invention is known in that it comprises a guide rail on which the articles are to be suspended in order to be transported, and first pneumatic guide means enabling the articles to be propelled along the guide rail in a given direction of transport.

In a manner characteristic of the invention, the air conveyor includes second pneumatic means which are designed to generate, when operated, a plurality of reverse air jets (R) orientated towards the articles in a direction opposite that of their direction of transport.

Thanks to the conveyor according to the invention, it is possible, in particular, in the event of an article jamming, to cause air to be supplied at least to the aeraulic section in which a jam has occurred, the main effect of which is to remove the pressure exerted on each other by the articles that have accumulated and to cause the article that has given rise to the jam to drop back down. Furthermore, when the articles subsequently move off again in the direction of transport, the articles located upstream of the jammed article apply to the latter a complementary mechanical action that facilitates its release.

In the event of forward jamming, it may also be advantageous to cause air to be supplied to one or more aeraulic sections located immediately downstream of the section in which the jam has occurred, so as to cause articles located downstream to return rearwards and to exert a complementary freeing action on the forward jammed article.

In one particular alternative embodiment, the conveyor according to the invention includes means for automatically controlling the supplying of air to each reverse blowing compartment, and means for detecting the jamming of one or more articles in the conveyor, which output detection signals for the control means; the control means are designed for automatically and selectively controlling, on the basis of the detection signals, the supply of air at least to the reverse blowing compartment in the area of which a point of jamming has been detected.

Preferably, the control means are also designed to control automatically, on the basis of the detection signals, the air supply to at least a reverse blowing compartment located immediately downstream of the compartment in the area of which a jam has been detected, so as to cause one or more articles located downstream of the point of jamming to return rearwards.

Another object of the invention is a process for freeing an article, or a plurality of articles, that has/have accidentally jammed while being transported in an air conveyor, in which the articles are transported while suspended.

Characteristically according to the invention, the process consists in generating temporarily, at least over all or some of the articles that are jammed, reverse jets of air that are orientated in the direction opposite the direction of transport of the articles.

According to an additional characteristic of the process of the invention, there are further temporarily generated, downstream of the point of jamming, reverse jets of air that are orientated in the direction opposite that of transport of the articles, so as to cause to return rearwards at least one article located immediately downstream of the point of jamming and to direct it into contact with the jammed article or articles.

A further object of the invention is a process for slowing down or immobilising one or more articles that are suspended and propelled along a guide rail through the action of transport air jets. Characteristically according to the invention, the process consists in generating on the articles reverse jets of air that are orientated in the direction opposite the direction of transport of the articles. In the framework of the invention, the articles can be slowed down or immobilised by using the reverse jets of air at the same time as the transport air jets. In an extreme case, if it is wished to slow down or immobilise the articles very swiftly, it can also be contemplated using, momentarily, only the reverse jets of air, for a time sufficient to obtain the desired slowing down or immobilisation.

Finally, another object of the invention is a process for imparting a rhythm to articles suspended and propelled along a guide rail. This process consists, on one hand, over a first portion of the path of the articles, in slowing down, and possibly immobilising, the article or articles by generating on the articles, in this first portion, reverse jets of air (R) orientated in the direction that is the reverse of the direction of transport of the articles, and, on the other hand, at the exit from the first portion, in accelerating the article or articles through the action of the transport air jets.

Further characteristics and advantages of the invention will emerge more clearly from a study of the description that will now be given of a preferred exemplary embodiment of an air conveyor according to the invention, which description is given by way of a non-limitative example and with reference to the annexed drawing, wherein.

The air conveyor illustrated in the annexed figures is adapted to the pneumatic transport of articles comprising a collar or the like, which enables them to be suspended during transport. In the exemplary form of embodiment illustrated, the articles are more particularly constituted by plastic bottles 1 comprising, in the area of their neck a collar-forming protuberance 2. The air conveyor comprises, as usual, a longitudinal guide rail 3, provided by means of two opposite 'under-neck' guides 4. Bottles 1 are transferred through the action of jets of air along guide rail 3, while suspended via their collars 2 on the two under neck-guides 4.

More particularly, in the example illustrated, the conveyor includes a main box, or chamber, 5 which extends longitudinally, parallel to the path of bottles 1, and which is centred on the path of bottles 1 in a longitudinal median plan (AA). This chamber 5 is split, by a longitudinal partition 8, into an upper longitudinal duct 6, referred to hereinafter as the main supply duct, and a lower longitudinal duct 7. The lower longitudinal duct 7 is, itself, divided into three secondary longitudinal ducts, by two internal longitudinal partitions 9: two external longitudinal ducts 10, symmetrical with one another in relation to the median plane (AA), and a central longitudinal duct 11, centred on the median plane (AA).

Figure 4:
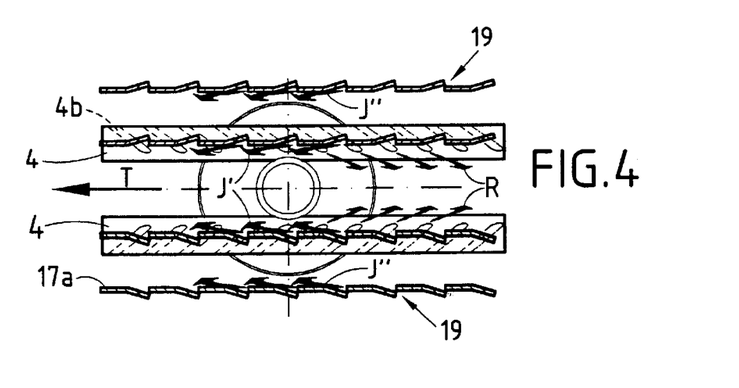
FIG. 4 is a schematic top view of the conveyor.

Lower wall 12 of central longitudinal duct 11 is constituted by a piece of sheet metal in the shape of an inverted U, which delimits a blowing channel 13 between under-neck guides 4 and central longitudinal duct 11. In wall 12 delimiting blowing channel 13 are provided a plurality of blowing slits 14, which are judiciously distributed over the entire length and on either side of the path of bottles 1. Blowing slits 14 cause the interior of central duct 11 to communicate with blowing channel 13; their geometry is such that, by supplying pressurised air to central duct 11, there are created, through blowing slits 14, air transport jets (J') (FIG. 4) which are orientated towards the necks of bottles 1, above their collars and in the direction of transport (T) of bottles 1.

Figure 1:
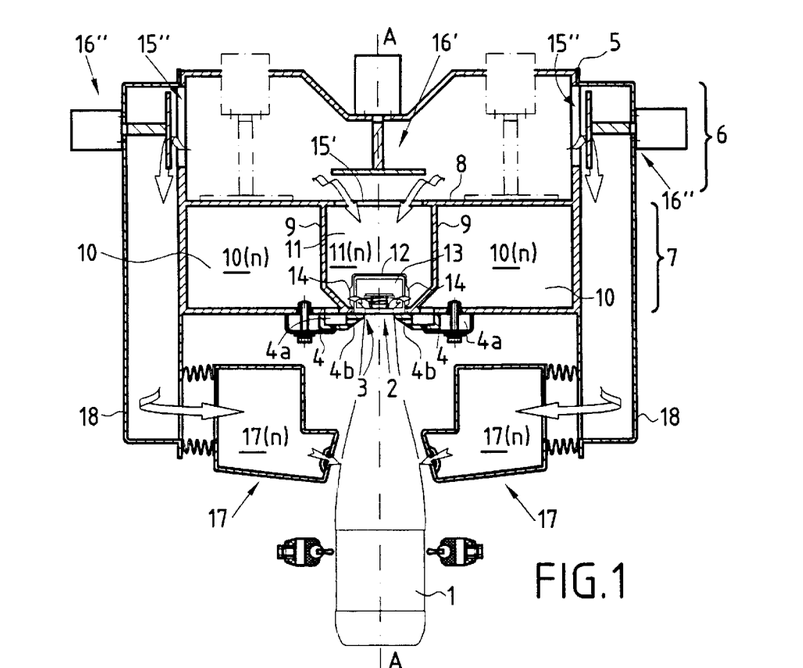
FIG. 1 is a schematic cross-sectional view of a conveyor according to the invention, in the area of an aeraulic section configured in the normal direction of transport.
Figure 2:
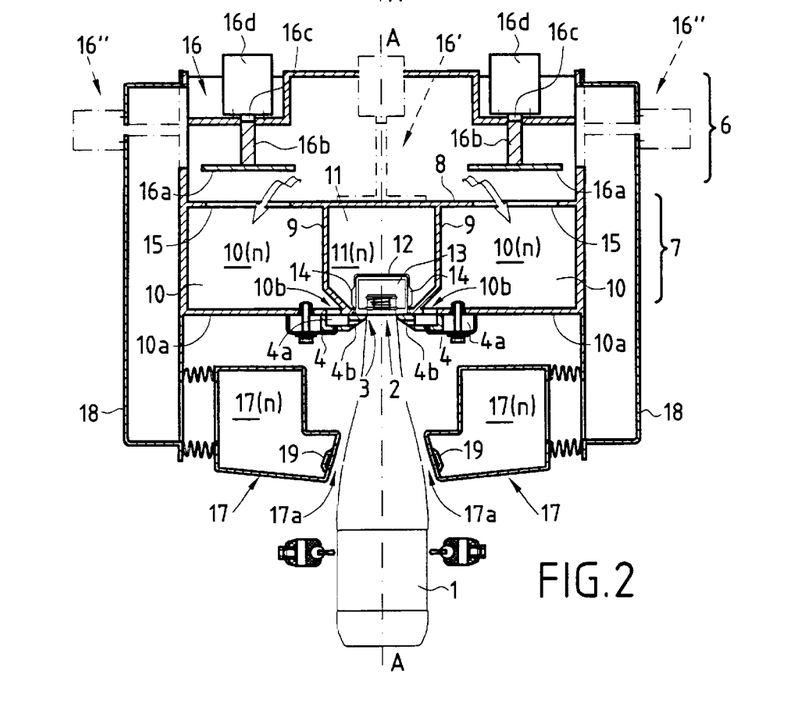
FIG. 2 is a schematic cross-sectional view of a conveyor according to the invention, in the area of an aeraulic section configured in the direction opposite that of transport.

With reference to FIGS. 1 and 2, each under-neck guide 4 is constituted by a longitudinal piece which is fixed to lower wall 10a of each longitudinal duct 10. Each under-neck guide 4 comprises a lower longitudinal cavity 4a which communicates with the corresponding longitudinal duct 10, via openings or slits 10b provided in wall 10a of duct 10. Each under-neck guide 4 further comprises a plurality of blowing channels 4b which are judiciously distributed over the entire length of under-neck guide 4 and which comprise a first end emerging in longitudinal cavity 4a and a second, opposite end emerging in the outside air in the vicinity of and below guide rail 3. With more particular reference to FIG. 4, each blowing channel 4b is orientated in such a way that, by supplying pressurised air to longitudinal cavity 4a via the corresponding longitudinal duct 10, there is created a plurality of reverse air jets (R), which are orientated in the direction of bottles 1, slightly below the level of their collars. According to one essential feature of the invention, these reverse air jets (R) are directed in a direction opposite to the direction of transport (T) of the bottles, that is to say in a direction opposite to that of the transport air jets (J').

Figure 5:
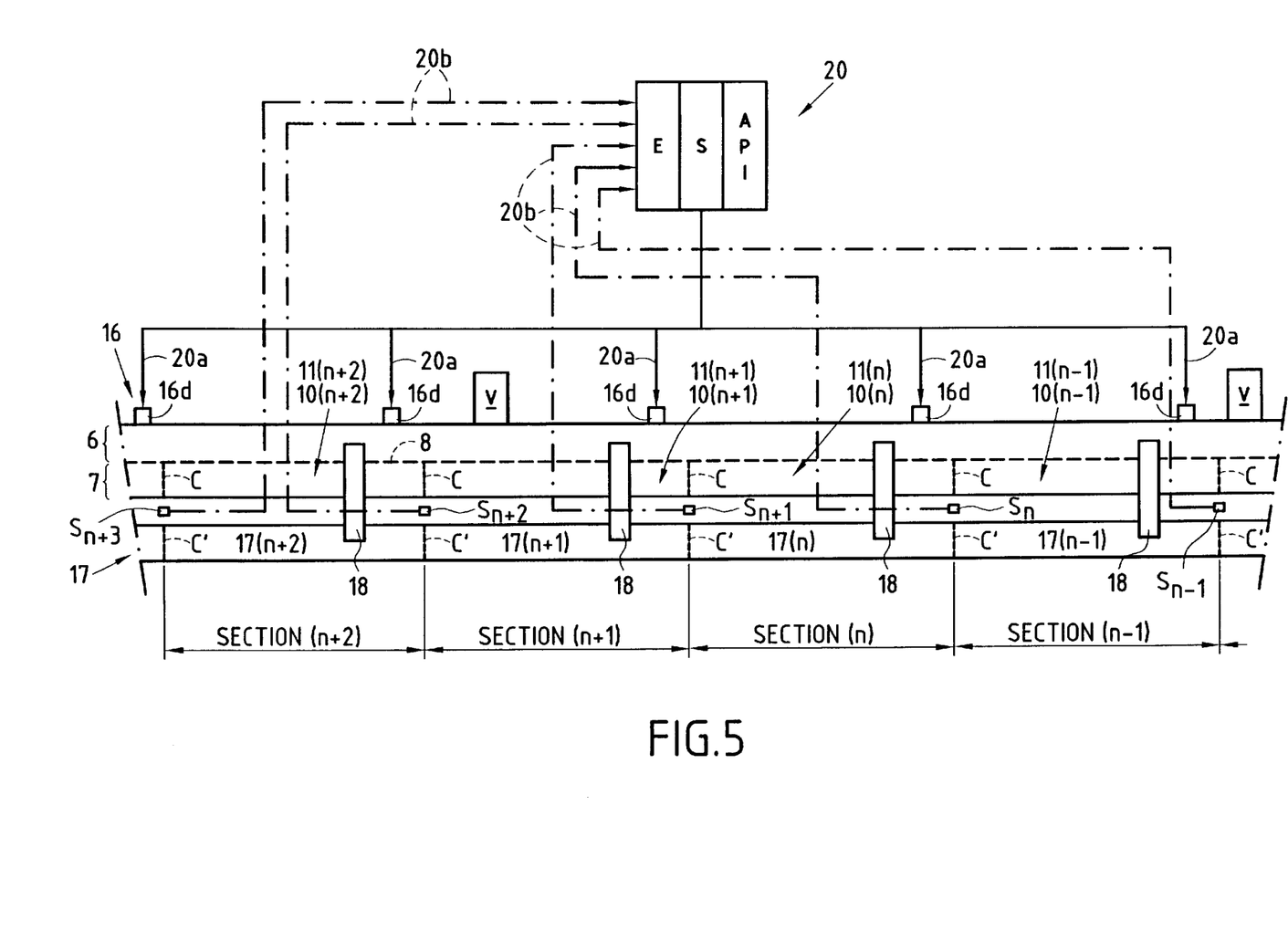
FIG. 5 is a schematic representation illustrating the splitting into aeraulic sections of the conveyor of FIGS. 1 to 4, as well as the detection and control means of this conveyor.

In the particular alternative embodiment illustrated in the figures, each longitudinal duct 10 is divided into a plurality of successive reverse blowing compartments [ . . . , 10(n+1), 10(n), 10(n−1), . . . ], by internal partitions (C) illustrated in dashed lines in FIG. 5, and each inverted blowing compartment [10(n)] is designed to be individually supplied with pressurised air. In the particular example illustrated, reverse blowing compartments [ . . . , 10(n+1), 10(n), 10(n−1), . . . ] are arranged in pairs, on either side of the path of bottles 1, with the compartments of each pair of reverse blowing compartments 10(n) facing one another corresponding to an aeraulic section (n).

In the preferred alternative embodiment illustrated in FIGS. 1 and 2, each compartment 10(n) comprises, in order to be supplied with pressurised air, an air admission opening 15, which is provided in longitudinal wall 8, and which enables compartment 10(n) to be placed in communication with main supply duct 6. In the area of each of air admission openings 15 is provided a member 16 which is operable electrically or pneumatically and which, generally speaking, has the function of permitting the adjustment, when operated, of the air flow rate at the entry to the corresponding compartment 10(n), that is to say the air flow through the corresponding admission opening 15.

In the particular example illustrated, each member 16 comprises, on one hand, a closing plate 16a which is housed inside the main supply duct 6 opposite air admission opening 15, and, on the other hand, means (16b, 16c, 16d making it possible, when operated, to displace plate 16a in a direction transverse to air admission opening 15. The means for displacing closing plate 16a are, for example, constituted by a mobile threaded rod 16b, which is fixed transversely to plate 16a, which is mounted for rotation on a ring 16c having an internal thread complementary to that of threaded rod 16 and mounted fixedly through the upper wall of main supply duct 6. Threaded rod 16b can be driven in rotation in one direction of in the other in relation to ring 16c by means of a motor 16d. The rotation of the threaded rod enables it to effect a translation movement in relation to ring 16c, and, as a result of this, depending on the direction of rotation of the threaded rod, to move plate 16a away from or towards the corresponding air admission opening 15. Depending on the position of plate 16a, the air passage cross-section between longitudinal duct 6 and compartment 10(n) is greater or smaller, which makes it possible to adjust the air flow rate at the entry to compartment 10(n).

Member 16 is designed in such a way that plate 16a can adopt at least two extreme positions, a first position (FIG. 1) in which plate 16a completely closes admission opening 15 and isolates corresponding compartment 10(n) of main supply duct 6, and a second extreme position (FIG. 2), in which admission opening 15 is not closed by plate 16a and the air passage cross-section is maximum. In a simplified alternative embodiment of the invention, it is conceivable for closing plate 16a to be adjustable in position solely in one or the other of these two extreme positions. In this case, control of the pressurised air supply to each compartment (10(n)) is of the 'all or nothing' type. To implement this simplified alternative embodiment, it is further advantageously possible to replace motor 16d, ring 16c and threaded rod 16c by a two-position pneumatic jack controlled via a solenoid valve. In one improved alternative embodiment, member 16 can be designed in such a way that plate 16a can assume several intermediate positions between the aforementioned two extreme positions, which permits finer adjustment of the air flow rate at the inlet to compartment 10(n).

With reference to FIG. 5, main supply duct 6 is designed to be supplied with pressurised air by means of a plurality of fans (V), which are judiciously distributed over the entire length of duct 6. When admission openings 15 of the two compartments 10(n) of an aeraulic section (n) are not closed by plate 16a, these compartments 10(n) are supplied with pressurised air by duct 6, and there are thus created a plurality of reverse air jets (R) in the area of the aeraulic section (n) corresponding to these compartments.

Figure 3:
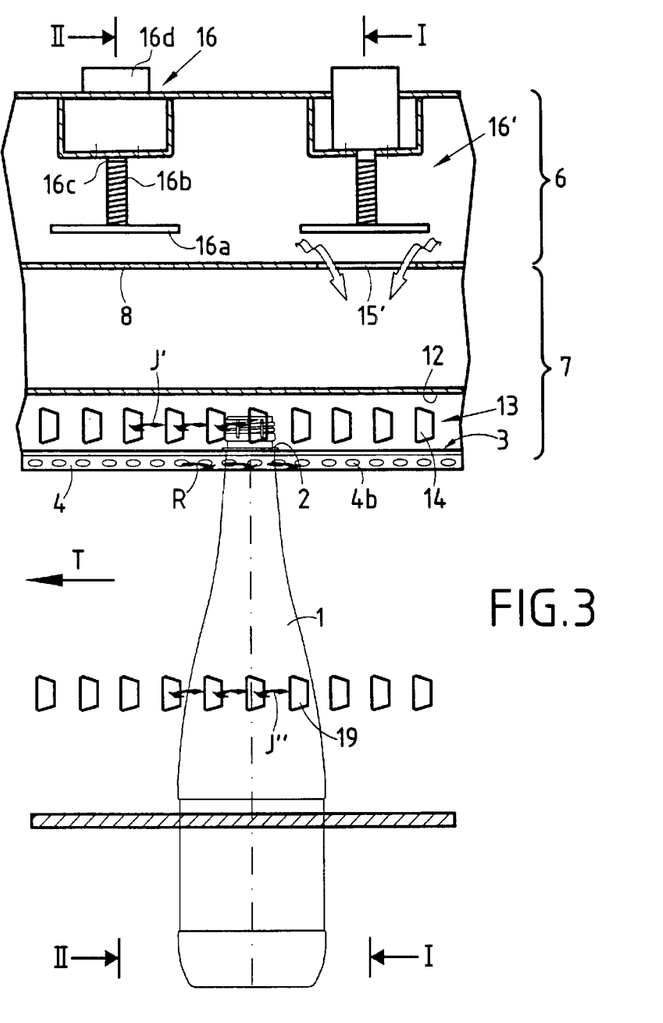
FIG. 3 is a schematic longitudinal section of the conveyor of FIG. 1 or 2.

In a way similar to that described in connection with longitudinal duct 10, longitudinal duct 11 is divided into a plurality of successive compartments 11(n). The splitting into successive aeraulic compartments of central duct 11 is preferably identical with that of ducts 10, with each compartment 11(n) belonging to the same aeraulic section (n) as corresponding compartments 10(n). Each compartment 11(n) comprises an air admission opening 15' (FIGS. 1 and 3) which enables it to be placed in communication with main supply duct 6, and is equipped with a member 16' that is identical with, and has the same function as, that of member 16 described previously and associated with each compartment 10(n). It is thus advantageously possible, via each member 16', to control the supply of pressurised air to corresponding compartment 11(n) and, thereby, to create, when operated, a plurality of transport air jets (J') in the area of the aeraulic section (n) corresponding to this compartment 11(n).

In the preferred alternative embodiment illustrated, the air conveyor further includes two lower additional longitudinal chambers 17, which are mounted on either side of the path of bottles 1 below chamber 5. Each longitudinal chamber 17 is divided into a plurality of successive compartments 17(n) by means of lateral partitions C' schematically illustrated in dashed lines in FIG. 5. Each compartment 17(n) individually communicates, in order to be supplied with pressurised air, with main supply duct 6, via a supply conduit 18, which is connected to an air admission opening 15" (FIG. 1) provided in a wall of main supply duct 6. With each compartment 17(n) is associated a member 16" which is identical with, and performs the same functions as, members 16 described above. Each compartment 17(n) comprises a blowing face 17a in which are provided a plurality of blowing slits 19 which make it possible, when compartment 17(n) is supplied with pressurised air, to create a plurality of transport air jets (J") (FIGS. 3 and 4) orientated onto the bodies of bottles 1 and in the direction of transport (T).

With reference to FIG. 5, the air conveyor is also equipped with an industrial type programmable controller 20 which makes it possible, by means of command signals 20a, to control automatically members 16 of each reverse blowing compartment 10(n) and, thereby, to control automatically and selectively the supply of pressurised air to the two compartments 10(n) of a given aeraulic section (n). Similarly, industrial programmable controller 20 also permits automatic, selective control of members 16' and 16". For the sake of clarity in FIG. 5, members 16' and 16", as well as their command signals handled by industrial programmable controller 20 have been omitted.

The air conveyor is also equipped, in the area of each aeraulic section (n), with at least one sensor ($S_n$), the function of which is to detect the presence of bottles 1 in the aeraulic section (n). Preferably, as illustrated in FIG. 5, each sensor ($S_n$) is positioned at the entry to the aeraulic section (n), in relation to the direction of transport (T). These sensors are, preferably, contactless sensors such as, for example, optical sensors, of the photoelectric cell type, or again, ultrasonic sensors. Each sensor ($S_n$) outputs for the input module of industrial programmable controller 20, a detection signal 20b, which is processed by industrial programmable controller 20 to handle command signals 20a.

Advantageously, the air conveyor of the invention, a preferred alternative embodiment of which has just be described with reference to FIGS. 1 to 5, permits the swift, automated, remote release, without manual intervention, of bottles accidentally jammed in the air conveyor during their transport. This advantage will be more clearly apparent from the description that follows of a particular exemplary embodiment of the air conveyor of FIGS. 1 to 5.

Figure 6:
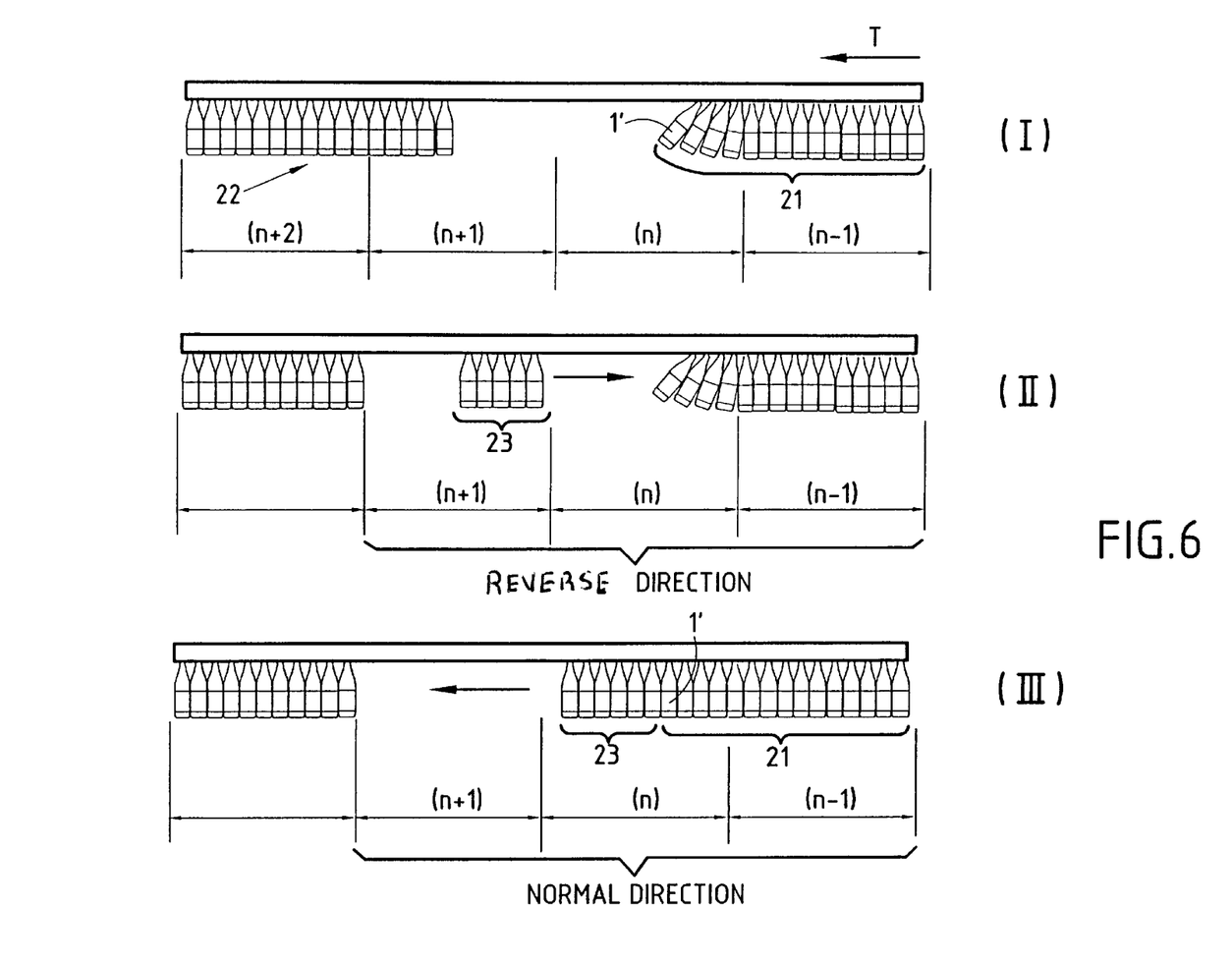
FIG. 6 illustrates the main three stages of the jamming and freeing of a train of bottles.

FIG. 6 shows a stage (I) in which a train 21 of bottles jams in an eraulic section (n), and the consecutive two main stages (II and III) of the freeing of the bottles and of resumption of the transport of the freed bottles. In said FIG. 6, for the sake of simplicity, blowing chambers 17 have not been shown.

During normal bottle transport, each aeraulic section (n) of the conveyor is, for example, in the configuration of FIG. 1, or so-called normal direction of transport. In this configuration, all air admission inlets 15 of the two ducts 10 are closed, and all air admission openings 15' and 15" are open. As main supply duct 6 is constantly supplied with pressurised air by fans (V), all the compartments of central duct 11, as well as all the compartments of chambers 17, are consequently supplied with pressurised air, and generate along the path of the bottles a plurality of transport air jets J' and J" which make it possible to propel bottles 1 suspended on under-neck guides 4 along guide rail 3 formed by said under-neck guides 4 and in direction of transport T. The different compartments 10(n) of the two ducts (10) are not, for their part, supplied with pressurised air and, consequently, no reverse air jets (R) are generated along the path of the bottles. Advantageously, in this configuration in the normal direction of transport, by acting on the positions of the closing plates associated with admission openings 15' and 15", one acts in the area of each aeraulic section (n) on the speed of transport air jets J' and J", which enables the bottle conveying speed to be optimised in the area of each aeraulic section.

During their transport, the bottles tend to oscillate from front to back in the vertical plane (AA). With reference to stage (I) of FIG. 6, it will be observed that leading bottle 1' of bottle train 21 has oscillated forwards, during its transport, through an excessive angle and is jammed between the two under-neck guides 4 in the area of the aeraulic section section (n). The following bottles in train 21 have collided with said forward jammed bottle 1', and come to bear; pressed against one another, on said bottle 1', thus yet further jamming it in relation to under-neck guides 4. In FIG. 6, bottle train 22 located downstream of bottle train 21 is assumed to be in movement in the direction of transport (T).

In the particular example illustrated in stage (I) of FIG. 6, the sensors ($S_n$) and ($S_{n-1}$) of the aeraulic sections (n) and (n−1) detect the jamming of bottle train 21, whereas the other sensors of the conveyor and, in particular, the sensor ($n+_1$) immediately downstream of the sensor ($S_n$) does not detect a jam. Programmable controller 20 is programmed in order, initially, to determine from among the sensor or sensors outputting a detection signal 20b characteristic of a jam, the one that is the furthest downstream in relation to the direction of transport (T). In the example shown in FIG. 6, controller 20 determines automatically whether it is sensor ($S_n$) and, thereby, that the point at which train 21 is jammed is located in the area of the aeraulic section (n). Programmable controller 20 is programmed in order, secondly, to selectively control members 16, 16' and 16" of the compartments at least of the aeraulic section in which a point of jamming has been detected, that is to say, in the case in point, members 16, 16' and 16" of compartments 10(n), 11(n) and 17(n) of the aeraulic section (n), so as to configure the aeraulic section (n) in the direction opposite that of transport, as illustrated in FIG. 2. Preferably, the programmable controller is also programmed for also selectively controlling members 16, 16' and 16" of the compartments of the aeraulic section (n−1), that is to say of the section located immediately upstream of the section in which a jam has been detected, so as to configure this (n−1) section also in the direction opposite that of transport. In this configuration in the direction opposite that of transport, air admission openings 15 of each compartment 10(n) and 10(n−1) are no longer closed by closing plates 16a; compartments 10(n) and 10(n−1) of aeraulic sections (n) and (n−1) are consequently supplied with pressurised air, which has the effect of generating reverse air jets (R) on bottle train 21 in hydraulic sections (n) and (n−1). Air admission openings 15' and 15" of compartments 11(n) and 17(n) of aeraulic section (n) and of compartments 11(n−1) and 17(n−1) of section (n−1) are closed, and no transport air jet J' or J" is generated in aeraulic sections (n) and (n−1). The reverse air jets (R) advantageously make it possible to remove the pressure against one another of the bottles of train 21 and, thereby, to remove the mechanical thrust exerted on forward jammed leading bottle 1'.

The action of reverse air jets (R) selectively generated in aeraulic section (n) and, in a preferred alternative embodiment, in section (n−1) immediately upstream, does not suffice, in most cases, to free bottle 1' in the event of forward jamming. For this reason, in the case of forward type jamming, programmable controller 20 is further advantageously programmed in order, thirdly, on one hand, to determine automatically, from detection signals 20b, in which aeraulic section the bottle preceding forward jammed bottle 1' is positioned and, on the other hand, to control automatically members 16, 16' and 16" of this downstream aeraulic section, and, if applicable, of all the aeraulic sections located between this downstream section and the section in which the jam has been detected, so as to configure these aeraulic sections in the direction opposite that of conveying. In the particular example illustrated in FIG. 6, the bottle immediately downstream of forward jammed bottle 1' is located in the area of section (n+1) immediately downstream of aeraulic section (n) in which the point of jamming has been detected. As a result, only this downstream aeraulic section (n+1) is automatically configured in the direction opposite that of conveying. In the event of, for example, the bottle preceding forward jammed bottle 1' being located in section (n+2), the programmable controller would automatically operate not only members 16, 16' and 16" of aeraulic section (n+2) but also those of aeraulic section (n+1) so as to configure them in the direction opposite that of conveying. The result is that the bottle or bottles located in these downstream aeraulic sections configured in the direction opposite that of conveying are sent back rearwards (stage II of FIG. 6) in the form of a bottle train 23 which collides with forward jammed bottle 1'. In this way, there is very advantageously implemented a complementary mechanical action for freeing bottle 1'.

When programmable controller 20 detects, via detection signal 20b output by captors ($S_n$) associated with aeraulic section (n), that bottle train 21 has been effectively freed, or, as applicable, in another alternative embodiment after the lapsing of a determined time delay, programmable controller 20 automatically operates, fourthly, members 16, 16' and 16" of the aeraulic sections that have been configured in the direction opposite that of transport, that is to say in the aforementioned example, members 16, 16' and 16" of aeraulic sections (n−1), (n) and (n+1), so as to re-configure these aeraulic sections in the normal direction of transport. The bottle train formed by bottle train 21 and by train 23 of bottles that has been sent rearwards into contact with bottle 1' thus resume their normal direction of conveying (direction of transport T), through the action of transport air jets J' and J". It should be noted that the bottles of train 21 located upstream of bottle 1' will have moved away from this bottle, returning rearwards in relation to the direction of transport, when sections (n) and (n−1) were configured in the direction opposite that of transport. When sections (n) and (n−1) are re-configure in the normal direction of transport, the bottles collide with bottle 1' and, thereby, exert a complementary freeing action on said bottle.

A particular exemplary embodiment of the process according to the invention, applied to a particular case of forward jamming of a bottle 1', has been described with reference to FIG. 6. Quite obviously, the process according to the invention can, in general, be applied to any type of jamming and, in particular, to backward type jamming.

The conveyor according to the invention, a preferred alternative embodiment and implementation of which have been described with reference to FIGS. 1 and 6, advantageously, and generally speaking, makes it possible to act in a highly reactive and localised manner in the area of an aeraulic section, on the speed and direction of conveying of the articles. Thus, in addition to the freeing of the articles, the conveyor also makes it possible, by suitably controlling the means for supplying pressurised air to the compartments of each aeraulic section, to adapt the speed of the articles in each aeraulic section and, for example, to provide an aeraulic brake in the area of one or more successive sections in a given part of the conveyor, or again, to immobilise the articles temporarily in one or more sections; in this case, in the area of these aeraulic sections, transport air jets (J' and/or J") and reverse air jets (R) are generated simultaneously. It is further advantageously possible, by suitably operating the means for supplying pressurised air to the compartments of a given aeraulic section, to convert this section into an article rhythm-imparting means. To convert an aeraulic section (n) into an article rhythm-imparting means, sections (n+1) and (n−1) upstream and downstream of this section (n), for example, are configured in the normal direction of conveying; on one hand, members 16 of compartments 10(n) of section (n) are operated so as to open air admission openings 15 and to generate reverse air flows (R) in section (n) and, on the other hand, members 16' and 16" of compartments 11(n) and 17(n) of section (n) are operated so as to open also air admission openings 15' and 15" and, thereby, to generate transport air jets (J') and (J") in section (n) at the same time as reverse air jets (R). Members 16, 16' and 16" are operated in such a way that the aeraulic power of transport air jets (J') and (J") is greater than that of reverse air jets (R). This has the effect of sending the bottles in aeraulic section (n) in their direction of transport, but at a lower speed, up to the entry of downstream section (n+1), where the bottles pick up speed again, whence the rhythm-imparting effect. In downstream section (n+1), it can be contemplated implementing simultaneously transport air jets (J') and (J") and reverse air jets (R) simultaneously, the important thing being that the bottles should be accelerated on exiting section (n).

The function of separating partitions C or C' is to create blowing compartments the internal static pressure of which can be adjusted for each individual compartment. As a result, it is not necessary for the partitions to be absolutely tight, and a certain rate of leakage between adjacent compartments can be tolerated, as long as this rate of leakage remains sufficiently small in relation to the static pressures involved; it is further possible to use partitions C or C' that are not solid, on condition that the partitions used permit the creation of a pressure drop that is sufficiently large for it to be possible to consider the compartments as substantially independent from an aeraulic viewpoint. In addition, the compartments are not necessarily produced by partitioning a longitudinal duct; they can be constituted by structurally independent chambers.

In the preferred exemplary embodiment that has been described, the splitting into compartments of central duct 11 and of the lower longitudinal chambers 17 makes it possible, during an operation to free articles, to halt the production of transport air jets (J', J") in a localised fashion, in the area of the aeraulic section or sections in which reverse air jets (R) are temporarily used, which has the advantage of not disturbing the operation of the conveyor in the other sections. This splitting into compartments of the pneumatic means enabling the articles to be propelled in the direction of transport (T) is not, however, essential, and it does not limit the invention.

In the preferred exemplary embodiment that has been described, the reverse blowing compartments [..., 10(n+1), 10(n), 10(n−1), ...] are individually connected, in order for them to be supplied with pressurised air, to main supply duct 6 and, for each reverse blowing compartment is provided a member 16 permitting adjustment of the air flow rate at the entry to the compartment. This characteristic does not limit the invention. According to another variant, arrangements could be made to supply each reverse blowing compartment by means, for example, of a fan that is specially assigned thereto, and the power of which is less than that of fans (V) of main supply duct 6.

In the conveyor of FIGS. 1 to 5, transport air jets (J') and (J") are generated respectively above and below guide rail (3), and reverse air jets (R) are generated at an intermediate level located between the levels of transport air jets (J') and (J"). This does not, however, limit the invention. In particular, according to another alternative embodiment, it can be contemplated designing an air conveyor using, in combination with the reverse air jets (R), a single type of transport air jet (J') or (J"). In addition, in the particular example illustrated in FIGS. 1 to 5, the reverse air jets are generated in the vicinity of, and below, guide rail 3. This special location of reverse air jets (R) does not, however, limit the invention, and reverse air jets (R) can, in general, be directed towards any portion of the articles. It may be noted, however, that it is advantageous to generate reverse air jets (R) in the immediate vicinity of guide rail 3, that is to say in the area of collar 2 of articles 1, in order to minimise the moment in relation to guide rail 3 of the pressure exerted on the articles by the reverse air jets, and thereby prevent the reverse air jets from accentuating the angle of rocking of the articles in the vertical plane.

What is claimed is:

1. Air conveyor for the transport of articles comprising:
    a pair of guide rails on which the articles are suspended in order to be transported;
    a first pneumatic means adapted for propelling the articles along the guide rail in a given direction of transport (T); and
    a second pneumatic means adapted for generating, when activated, a plurality of reverse air jets (R) orientated onto the articles in a direction opposite that of the direction of transport.

2. The conveyor according to claim 1, wherein the second pneumatic means comprises a plurality of reverse blowing compartments [..., 10(n−1), 10(n), 10(n+1), ...] disposed along the path of the guide rail, each of the plurality of reverse blowing compartments including at least one reverse air jet operable to be individually supplied with pressurised air.

3. The conveyor according to claim 2, further comprising;
    control means for automatically controlling the supply of air to each of the plurality of reverse blowing compartment [..., 10(n−1), 10(n), 10(n+1), ...]; and
    a plurality of sensors (..., $S_{n-1}$, $S_n$, $S_{n+1}$, ...), at least one of said plurality of sensors disposed proximate to the entry of a corresponding compartment, each of the plurality of sensors operative to detect the presence of one or more articles in the corresponding reverse blowing compartments of the conveyor said sensing means outputting detection signals to the control means, wherein the control means detects when jamming has occurred in a particular compartment as a function of the detection signals corresponding to said compartment, the control means automatically and selectively control, based on the detection signals, the supply of air to the corresponding reverse blowing compartment $10(n)$ wherein jamming has been detected.

4. The conveyor according to claim 3, wherein the control means further automatically and selectively control, on the basis of the detection signals, the supply of air to the reverse blowing compartment $10(n-1)$ immediately upstream of the corresponding reverse blowing compartment $10(n)$ wherein jamming has been detected.

5. The conveyor according to claim 3, wherein the control means further automatically controls, on the basis of the detection signals, the supply of air to the reverse blowing compartment $10(n+1)$ located immediately downstream of the corresponding reverse blowing compartment $10(n)$ wherein a jam has been detected, thereby causing one or more articles located downstream of the point of jamming to return rearwards.

6. Conveyor according to claim 1, wherein the first pneumatic means comprises a plurality of blowing compartments [ . . . , $11(n-1)$, $11(n)$, $11(n+1)$, . . . )/( . . . , $17(n-1)$, $17(n)$, $17(n+1)$, . . . ] disposed along the guide rail, the blowing compartments designed to be supplied with pressurised air, individually and jointly and when supplied with pressurised air, a plurality of air transport jets ('J' and/or J") are directed onto the articles in the direction of transport (T).

7. Conveyor according to claim 6, wherein the compartments [( . . . , $11(n-1)$, $11(n)$, $11(n+1)$, . . . )/( . . . , $17(n-1)$, $17(n)$, $17(n+1)$, . . . ] of the first pneumatic means and the reverse blowing compartments [ . . . , $10(n-1)$, $10(n)$, $110(n+1)$, . . . ] of the second pneumatic means are respectively aligned and constitute a plurality of successive aeraulic sections [ . . . , $(n-1)$, $(n)$, $(n+1)$, . . . ].

8. Conveyor according to claim 1, further comprising a main supply duct supplying the first and second pneumatic means with pressurised air, the main supply duct extending along the path of the articles.

9. Conveyor according to claim 1, wherein the first pneumatic means generate transport air jets (J') and (J") above and below the guide rail respectively, and the second pneumatic means generate reverse air jets (R) at a level located between the levels of the transport air jets (J') and (J").

10. Conveyor according to claim 1, wherein the second pneumatic means generate reverse air jets located in the immediate vicinity of the guide rail.

11. A process for treeing an article or a plurality of articles that are jammed during transport in an air conveyor, in which the articles are transported while suspended, comprising:

temporarily generating, over all or some of the articles that are jammed within a compartment, reverse air jets (R) orientated in the direction opposite the direction of transport (T) of the articles.

12. Process according to claim 11, further comprising:

temporarily generating, downstream of the compartment in which jamming has occurred, reverse air jets (R) orientated in the direction opposite the direction of transport (T) of the articles, for causing at least one article located immediately downstream of the point of jamming to return rearwards and be directed into contact with the article or articles jammed.

13. A process for slowing down or immobilising one or more articles that are suspended and propelled along a pair of guide rails of an air conveyor, comprising directing on the one or more articles reverse air jets (R) orientated in the direction opposite to the direction of transport (T) of the articles.

14. A process for imparting a rhythm to articles suspended and propelled along a pair of guide rails of an air conveyor by transport air jets focused in a given direction of transport (T), comprising:

over a first portion of the path of the articles, slowing down or immobilising the articles by focusing reverse air jets (R) orientated in the direction opposite that of transport of the articles on the articles in this first portion; and at the exit from the first portion, accelerating the articles with the transport air jets.

15. Conveyor according to claim 4, wherein the control means further automatically controls, on the basis of the detection signals, the supply of air to the reverse blowing compartment $10(n+1)$ located immediately downstream of the corresponding reverse blowing compartment $10(n)$ wherein a jam has been detected, thereby causing one or more articles located downstream of the point of jamming to return rearwards; the first pneumatic means comprises a plurality of blowing compartments [ . . . , $11(n-1)$, $11(n)$, $11(n+1)$, . . . )/( . . . , $17(n-1)$, $17(n)$, $17(n+1)$, . . . )] disposed along the pair of guide rails, the blowing compartments designed to be supplied with pressurised air, individually and jointly and when supplied with pressurised air, a plurality of air transport jets (J' and/or J") are directed onto the articles in the direction of transport (T); and wherein the compartments [( . . . $11(n-1)$, $11(n)$, $11(n+1)$, . . . )/( . . . , $17(n-1)$, $17(n)$, $17(n+1)$, . . . )] of the first pneumatic means and the reverse blowing compartments [ . . . , $10(n-1)$, $10(n)$, $10(n+1)$, . . . ] of the second pneumatic means are respectively aligned and constitute a plurality of successive aeraulic sections [ . . . , $(n-1)$, $(n)$, $(n+1)$, . . . ].

16. Conveyor according to claim 15, further comprising a main supply duct supplying the first and second pneumatic means with pressurised air, the main supply duct extending along the path of the articles.

17. Conveyor according to claim 15, wherein the first pneumatic means generate transport air jets (J') and (J") above and below the pair of guide rails respectively, and the second pneumatic means generate reverse air jets (R) at a level located between the levels of the transport air jets (J') and (J").

18. Conveyor according to claim 15, wherein the second pneumatic means are designed to generate reverse air jets located in the immediate vicinity of the pair of guide rails.

19. Conveyor according to claim 16, wherein the second pneumatic means generate reverse air jets located in the immediate vicinity of the pair of guide rails.

* * * * *

UNITED STATES PATENT AND TRADEMARK OFFICE
CERTIFICATE OF CORRECTION

PATENT NO. : 6,685,401 B1
DATED : February 3, 2004
INVENTOR(S) : Carlos de Almeida Rodrigues et al.

It is certified that error appears in the above-identified patent and that said Letters Patent is hereby corrected as shown below:

Column 8,
Line 62, "re-configure" should read -- re-configured --; and

Column 11,
Line 51, "treeing" should read -- freeing --.

Signed and Sealed this

Fourth Day of January, 2005

JON W. DUDAS
*Director of the United States Patent and Trademark Office*